United States Patent [19]
Lamon

[11] Patent Number: 5,752,467
[45] Date of Patent: May 19, 1998

[54] BRINE SHRIMP EGG CONVECTIVE COOLER

[75] Inventor: Mark S. Lamon, Hayward, Calif.

[73] Assignee: Ocean Star International, Inc., Snowville, Utah

[21] Appl. No.: 721,501

[22] Filed: Sep. 26, 1996

[51] Int. Cl.[6] ................................................. A01K 61/00
[52] U.S. Cl. ........................................ 119/201; 119/205
[58] Field of Search ................................. 119/204, 205, 119/201, 213, 214; 210/776

[56] References Cited

U.S. PATENT DOCUMENTS

| | | | |
|---|---|---|---|
| 376,553 | 1/1888 | Sandford | 119/201 |
| 4,498,190 | 2/1985 | Garlick, III | 119/201 |
| 4,839,062 | 6/1989 | Sanders | 210/776 |
| 5,293,838 | 3/1994 | Jorgensen et al. | 119/205 |

Primary Examiner—Christopher A. Bennett
Attorney, Agent, or Firm—A. Ray Osburn

[57] ABSTRACT

A method of dissipating heat from the interior of containers of harvested brine shrimp eggs to prevent overheating from spontaneous or environmental sources. Hollow convective members are installed embedded within the mass of eggs within the containers. The method helps in the use of larger, more efficient bags for brine shrimp eggs without increased mortality rates of the eggs.

17 Claims, 6 Drawing Sheets

BRINE SHRIMP EGG CONVECTIVE COOLER

BACKGROUND OF THE INVENTION

1. Field

The field of the invention is the storing and preservation of live brine shrimp cysts after harvesting from a body of water, such as Great Salt Lake, Utah. More particularly, the field of the invention is the storage of such cysts in large bags preparatory to final cleaning, drying and containerizing for shipment to ultimate users.

2. State of the Art

Brine shrimp cysts (eggs), when harvested directly from a body of water and stored in large bags tend to heat internally within the bags. The source of this heat may be bacterial decomposition of organic matter, such as already hatched brine shrimp and algae. Such foreign matter is often harvested along with the brine shrimp eggs. Alternately, some of the eggs may hatch spontaneously in the bag, with the shrimp subsequently decomposing to cause the rise in temperature. Temperature rise increases the frequency of mortality of the eggs. That is, fewer of the as harvested eggs will ultimately hatch to provide the brine shrimp for feeding of other aquatic species such as shrimp for human consumption. The use of smaller bags, stored separately avoids some of the heat accumulation which causes the rise in egg mortality. Refrigerated storage warehouses help control the internal temperature in the bags. Exposure to sunlight also raises internal temperatures, so that covering the bag with light colored reflective tarpaulins is helpful in sunlit areas. The eggs are most vulnerable during the period immediately following harvesting, during which the bags must be transported considerable distances to a facility for final processing. Once at such a facility, refrigerated storage is generally available.

While the problem of overheating of the interior of the shrimp storage bags has always existed, it is of growing concern because of the more predominant use of more efficient larger bags, which reduce the handling time and cost of the harvested shrimp cysts. The overheating problem has increased with this change, although it was made for economy of handling and processing.

A need therefore exists for an effective device or method for avoidance of the damage to the harvested shrimp by immediately removing the spontaneously generated heat from the interior of the bags.

BRIEF SUMMARY OF THE INVENTION

With the foregoing in mind, the present invention eliminates or substantially alleviates the rate of mortality of shrimp cysts stored in bags after harvesting from a body of water. In its preferred embodiment, the inventive device comprises at least one "U" shaped tubular convection structure placed within the harvested mass of eggs within the storage bag. The tubular structure is oriented with a lowermost leg in near horizontal position connecting with the two elongate vertical sides of the "U" of equal length. The tubular structure is open throughout. The ends of the vertical side members extend above the surface of the egg mass. Heat is conducted through the tubular walls and into the air in the tube, causing it to flow upwardly and out of the tube, replaced by a downward flow of ambient, cooler air. The U-tube may be installed tilted to raise one open end to a higher level than the other. This increases the "chimney" effect to enhance the convective flow, and also prevents occurrence of stagnant regions within the tubular structure. Alternately, the vertical legs of the "U" may be of unequal length, the longer then providing greater draw, assuring substantial flow through the horizontal bottom tube.

Preferably, the U-shaped convector tubes are utilized in pairs installed in perpendicularly crossing planes with their lowermost members vertically spaced apart. This arrangement provides convection channels strategically located within the bags for even, thorough cooling.

In accordance with another aspect of the invention, a row of spaced holes through each convective tube is provided on its inwardly facing side and the upwardly facing side of the bottom connecting tube. This allows flow of air from the tubes into the shrimp mass for further cooling. In practice, the spaced apart holes must be covered with a fine mesh screen to avoid entry of shrimp cysts into the interior of the tube.

The principal object of the invention is therefore the prevention of intolerable temperature rise in the interior of bags of stored brine shrimp eggs, to avoid premature mortality or hatching of the eggs while in storage, to increase the viability of the shrimp eggs after a period of storage.

BRIEF DESCRIPTION OF THE DRAWINGS

In the drawings, which represent the best modes currently contemplated for carrying out the invention

DETAILED DESCRIPTION OF ILLUSTRATED EMBODIMENTS

Figure 1:
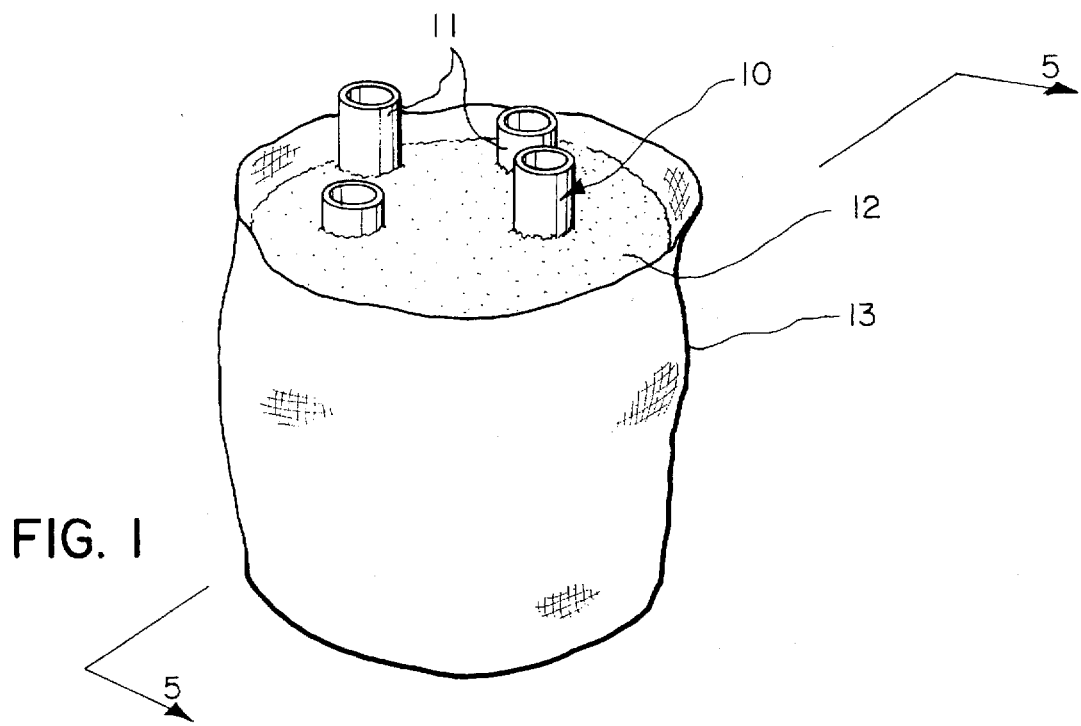
FIG. 1 is a perspective view of a bag container for a mass of shrimp eggs having convective cooling members installed therein, drawn to reduced scale, FIG. 2 a perspective view of an empty bag container for shrimp cysts, showing a pair of convective U-tubes supported therein, preparatory to filling said bag with shrimp eggs, drawn to the general scale of FIG. 1, FIG. 3 a side elevation view of one of the U-tubes comprising a convective cooler for the mass of shrimp within a container, drawn to reduced scale, FIG. 4 an elevation view of the convective U-tube of FIG. 3, showing holes through the walls of the tubular members thereof, covered by fine mesh screen to exclude shrimp eggs from the interior of said U-tube, drawn to the scale of FIG. 3, FIG. 5 a vertical cross sectional view taken along line 5—5 of FIG. 1, drawn to a somewhat larger scale.
Figure 3:
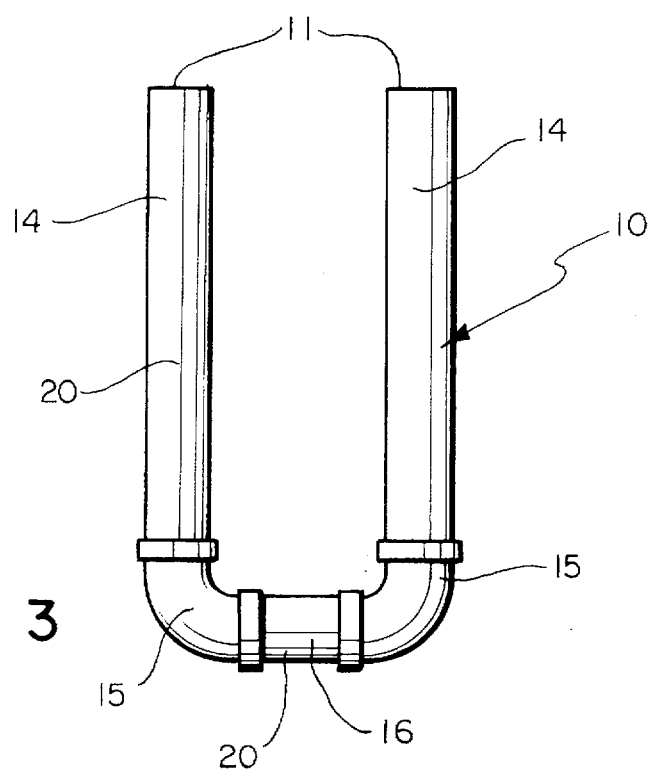

In FIG. 1, a pair of "U" shaped brine shrimp egg bags convective tube coolers 10 are shown with uppermost tube ends 11 extending above the surface of a mass of shrimp eggs 12 within a storage bag 13. In FIG. 3, one of the convective U-tubes 10 is shown in side elevation view. It comprises a pair of upwardly directed side tubes 14 secured as by elbows 15 to a bottom member 16. Vertical members 14, horizontal member 16 and elbow members 15 may advantageously be constructed of readily available four-inch diameter PVC tubing. However, other materials and tube sizes may be utilized. For example, the use of metallic materials might enhance the heat transfer from the eggs into the interior of the tubular members, although possible attendant problems of corrosion and contamination would be of concern.

Figure 2:
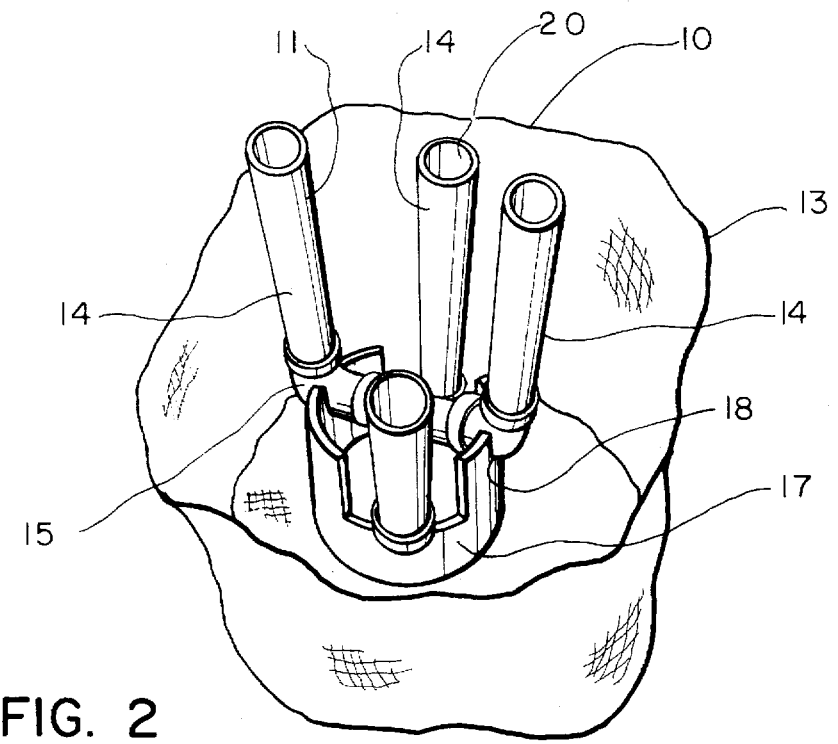
Figure 4:
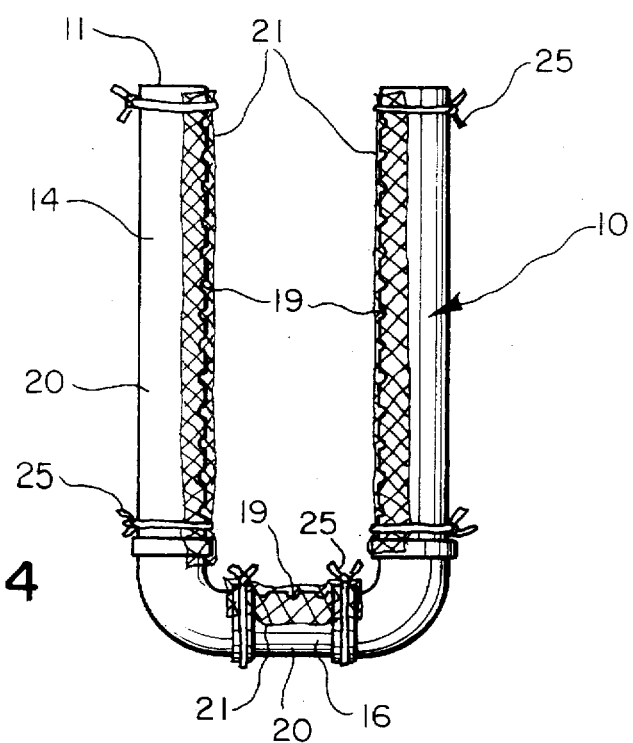

As indicated in FIG. 2, the convective U-tubes 10 may be installed internally to the egg storage bag 13 before filling therearound. The U-tubes 10 may be raised upon a tube support structure 17 advantageously cut from a length of 8' pipe of the same PVC material. Arcuate cuts 18 serve as cradles for bottom members 16 of both U-tubes 10. (FIG. 5) A spaced apart row of bores 19 through the wall 20 of each of the vertical tubes 14 and the horizontal tube 16 is provided, along with a covering of fine mesh screen 21 secured by tape 25 or the like. (FIG. 4)

Figure 5:
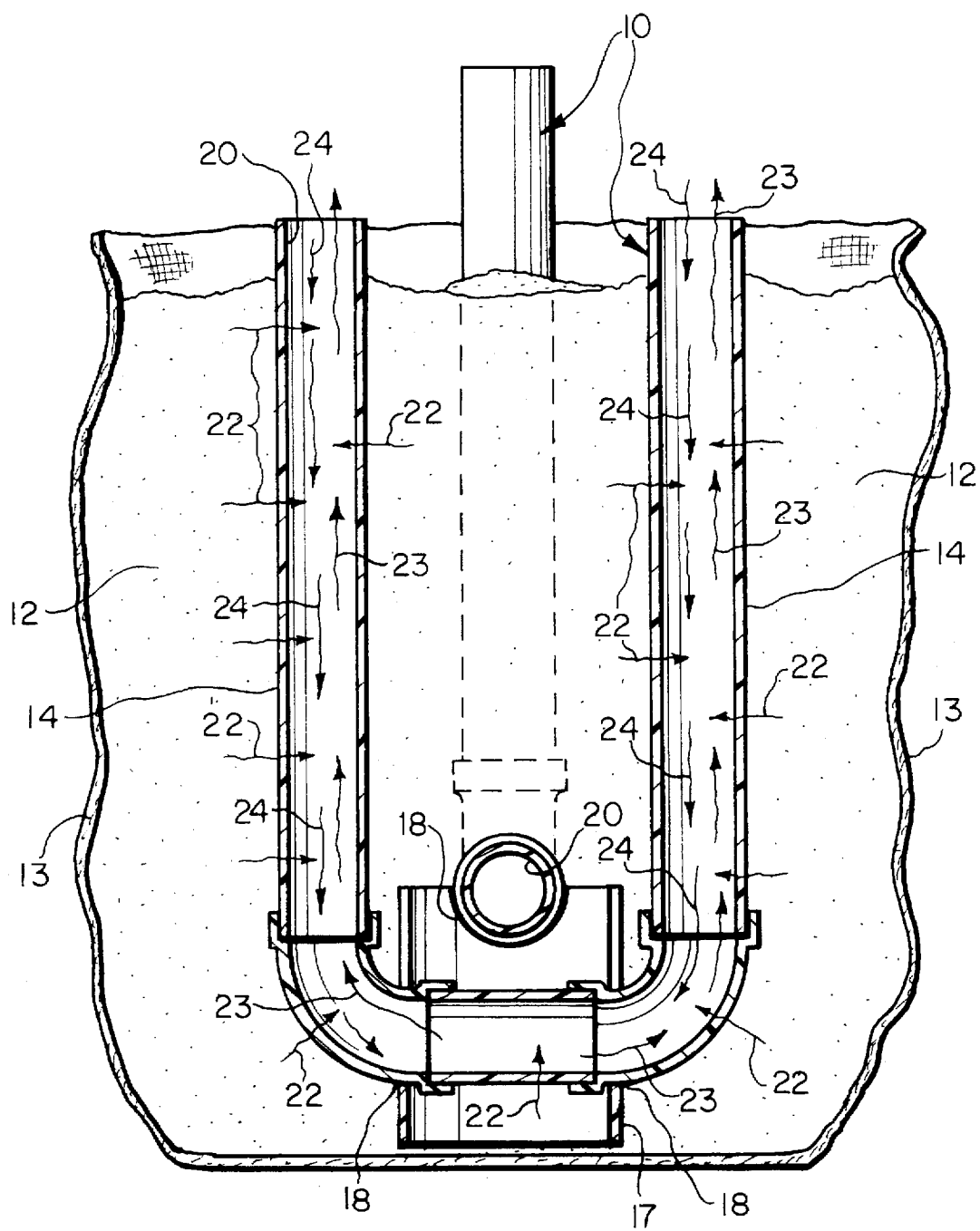

The mode of operation of the shrimp egg coolers 10 is evident from FIG. 5, a vertical cross section through a bag 13 filled with shrimp eggs 13, taken at the plane of the lowermost of a pair of U-tubes. As indicated by arrows 22, heat generated within the shrimp egg mass is conducted through the tubular walls 20. As indicated by upwardly directed arrows 23, the warmed air rises through the side tube members 14 to emerge from the open end 11. At the same time, cooler ambient air flows downwardly as indicated by arrows 24 to replace the expelled heated air.

Figure 6:
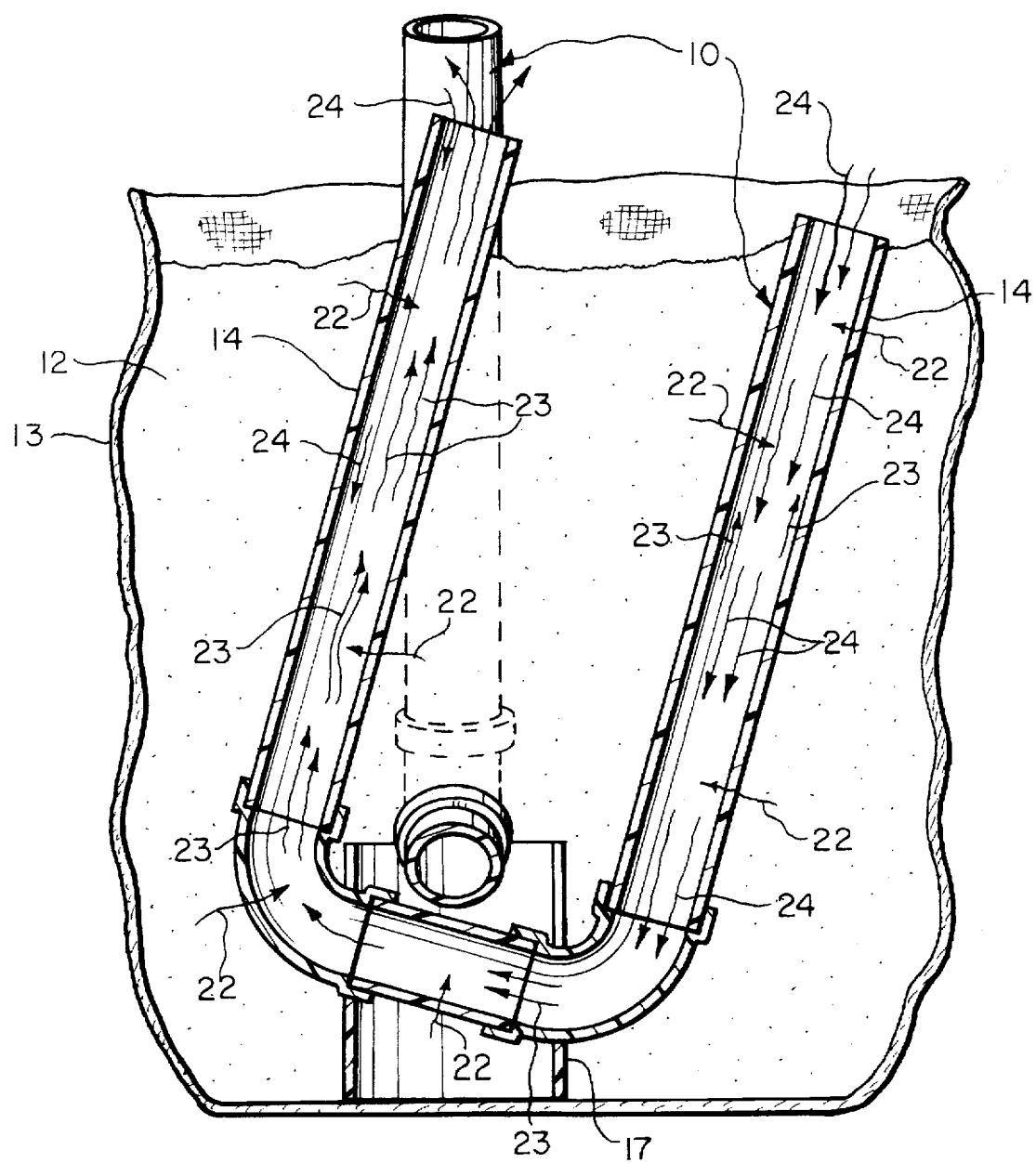
FIG. 6 the cross sectional view of FIG. 5, however with the U-tube convective coolers shown substantially tilted from vertical, drawn to the same scale, FIG. 7 a cross sectional view of a shrimp containing bag having a pair of vertically disposed tubular segments therein to serve as convective coolers, drawn to the approximate scale of FIG. 1, FIG. 8 a perspective representation of another embodiment of a convective cooling structure, shown mounted within an empty shrimp bag, drawn to the scale of FIG. 1, and FIG. 9 a side elevation view of a U-tube convective cooler unit, with one vertical tubular member thereof substantially longer than the other vertical tube, drawn to the scale of FIG. 3.

The convective flow may be substantially increased by tilting each of the U-tubes 10, such as roughly 15°, as indicated in FIG. 6. This creates longer tube length above the lowest point of the tilted tubes, providing more convective draw. This orientation also eliminates any possible stagnant areas, since all tube members slope upwardly.

Figure 9:
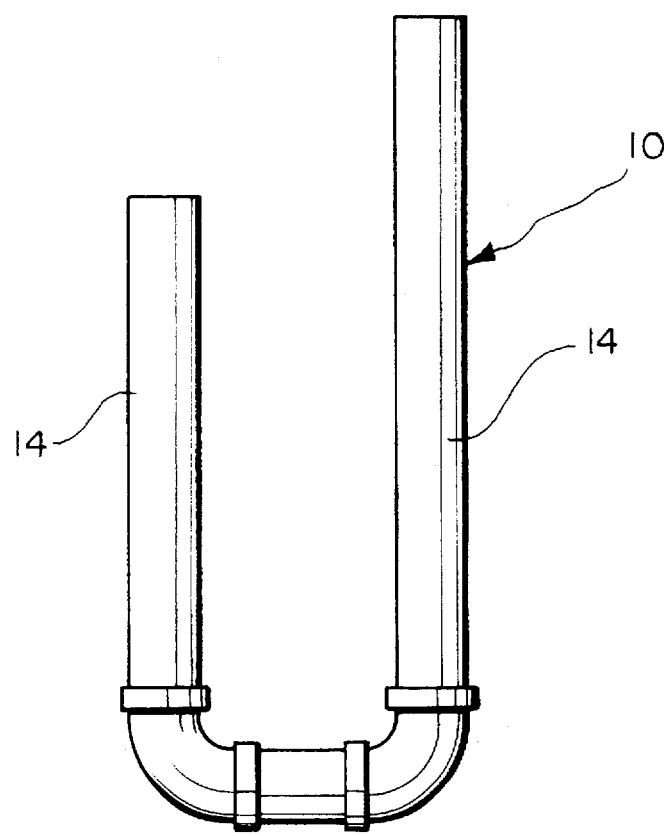

Another way to assure continuous flow horizontally through the tubes of the U, including bottom members 16, is to provide side tubes 14 of unequal length. (FIG. 9) The longer vertical tube, by providing greater draw, assures such flow without the need for tilting the entire U structure. Another way, not shown, of providing unbalanced tube draw is to use tubes 14 of unequal size. This would however result in undesirable uneven cooling of the shrimp egg mass.

It is advantageous, although not essential, that the air exchange bores 19 be provided upon the vertical and horizontal members 14 and 16 respectively of the U-tubes 10. The bores allow air to flow into-or out of the body of cysts 12. Cooling air which permeates the mass of eggs in this manner enhances the cooling. As best seen in FIG. 4, the small holes 19 may be evenly spaced, and covered by the fine mesh screen 21 to prevent entry of individual cysts 12 into the interior of the U-tube. Ties 25 may be used to secure screen strips 21 to the members of the U-tube 10.

The U-tubes are placed within the shrimp containing bag to be strategically located for removal of heat from the entire mass of the shrimp eggs. If the tubes are located with bottom members 16 approximately ⅓ and ⅔ of the depth of the eggs 12, and the side members located ⅓ of the distance from the side of the bag to its center, efficient cooling is expected to result.

Figure 7:
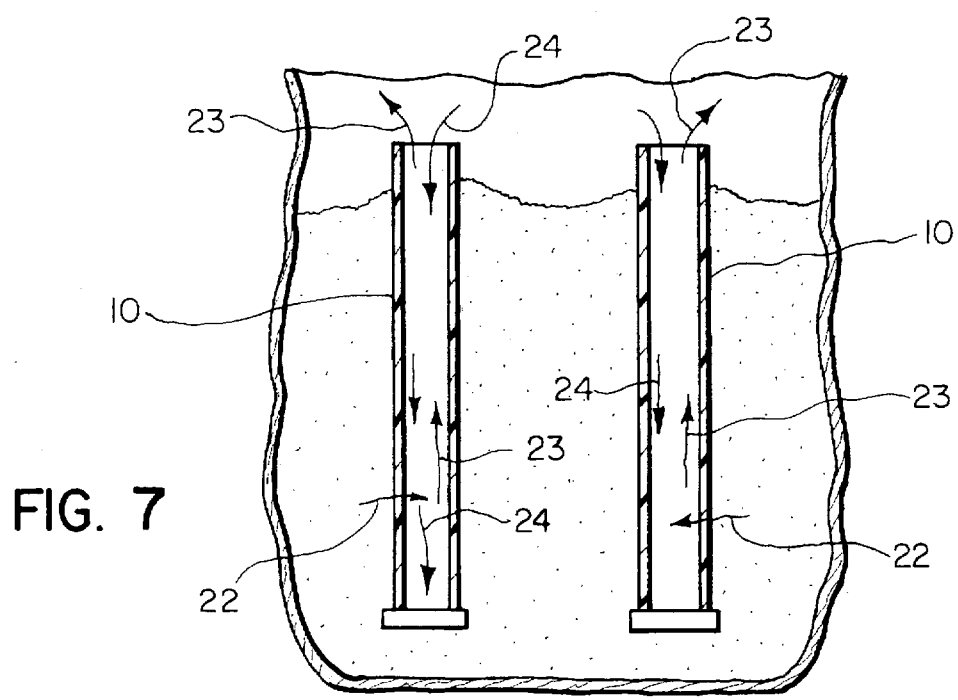
Figure 8:
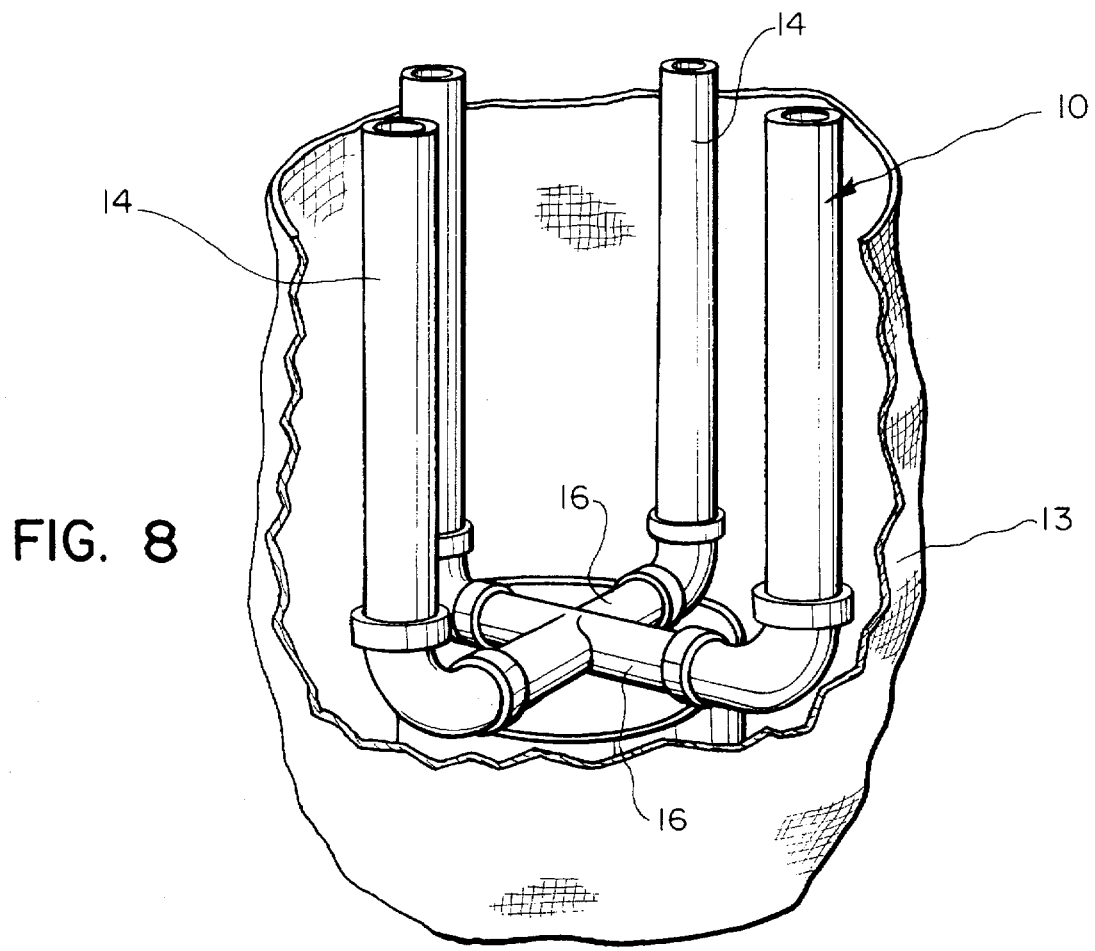

Other convective cooling devices may be within the spirit of the invention. For example, the straight, closed bottom, open top tubes of FIG. 7 would provide significant internal cooling of the mass of eggs 12. Another possible embodiment is indicated in FIG. 8, wherein the bottom tube members 16 are joined. This embodiment might not provide some of the vertical placement versatility of the paired, separate U-tubes, but would be easier to install within the bag. Still other convective member embodiments and placeements would also be within the spirit of the invention.

The inventive apparatus may be embodied in other specific forms, and the method in other specific steps, without departing from the spirit or essential characteristics thereof. The present apparatus and method are therefore to be considered illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A method of preventing unacceptable temperature increase within a mass of brine shrimp eggs stored in an open topped container, comprising the steps:

providing at least one elongate hollow empty member installed within the mass of eggs in the container, said member being everywhere closed beneath the mass of eggs and having at least one opening positioned above the surface of said mass.

2. The method of claim 1, wherein the hollow member comprises:

at least two generally vertical tubes each having a wall member and an open uppermost end above the surface of the mass of eggs and a lowermost end, said lowermost ends being joined to provide a continuous passage through the hollow member.

3. The method of claim 2, wherein:

at least two hollow members are provided within the mass of eggs in the container.

4. The method of claim 3, wherein:

the lowermost ends of the generally vertical tubes of each hollow member are joined by a generally horizontal tube having a wall member.

5. The method of claim 4, wherein:

one of the hollow members is installed upwardly of the other of said hollow members.

6. The method of claim 1, wherein:

the hollow empty member comprises a generally vertical tubular member having a closed bottom end and an open top end.

7. The method of claim 2, wherein:

the two generally vertical tubes are disposed within a common generally vertical plane; and wherein the hollow member is tilted substantially from vertical within said common plane.

8. The method of claim 5, wherein:

the two generally vertical tubes of each hollow member are disposed within a common generally vertical plane; and at least one of the hollow members is tilted substantially from vertical within the common plane of the vertical tubes thereof.

9. The method of claim 4, wherein:

the tubes of the hollow member carry vertically spaced apart bores through the wall members thereof, said bores all being covered by fine mesh screen material.

10. The method of claim 2, wherein:

one of the two generally vertical tubes is substantially longer than the other of said tubes.

11. The method of claim 4, wherein:

one of the two generally vertical tubes is substantially longer than the other of said tubes.

12. The method of claim 5, wherein:

one of the two generally vertical tubes is substantially longer than the other of said tubes.

13. The method of claim 1, wherein the hollow empty member comprises:

at least three generally vertical tubes each having an open uppermost end above the surface of the mass of eggs and a lowermost end, said lowermost ends being joined to provide continuous passage ways between and among said tubes.

14. The method of claim 1, wherein:

the hollow, empty member comprises PVC plastic tubing.

15. The method of claim 4, wherein:

the hollow members comprise PVC plastic tubing.

16. The method of claim 8, wherein:

the hollow members comprise PVC plastic tubing.

17. The method of claim 12, wherein:

the hollow members comprise PVC plastic tubing.

* * * * *